United States Patent [19]

Feldman et al.

[11] Patent Number: 4,684,361
[45] Date of Patent: Aug. 4, 1987

[54] CENTRIFUGE

[75] Inventors: Louis W. Feldman; David H. Yawn, both of Houston, Tex.

[73] Assignee: Cardiovascular Systems, Inc., The Woodlands, Tex.

[21] Appl. No.: 786,780

[22] Filed: Oct. 11, 1985

[51] Int. Cl.$^4$ .................. B04B 7/08; B04B 9/00
[52] U.S. Cl. .................. 494/41; 277/81 R; 277/212 F; 277/212 FB
[58] Field of Search .......... 494/38, 39, 41, 84; 277/81 R, 95, 152, 121 F, 212 FB, 212 F

[56] References Cited

U.S. PATENT DOCUMENTS

| | | | |
|---|---|---|---|
| 1,684,870 | 9/1928 | Lewis | 494/38 |
| 3,054,620 | 9/1962 | Schwing | 277/95 |
| 3,145,713 | 8/1964 | Latham, Jr. | 128/214 |
| 3,317,127 | 5/1967 | Cole | 233/26 |
| 3,409,213 | 11/1968 | Latham, Jr. | 233/21 |
| 3,565,330 | 2/1971 | Latham, Jr. | 233/21 |
| 3,581,981 | 6/1971 | Latham, Jr. | 233/21 |
| 3,634,228 | 1/1972 | Latham, Jr. | 210/21 |
| 3,785,549 | 1/1974 | Latham, Jr. | 233/23 |
| 4,086,924 | 5/1978 | Latham, Jr. | 128/214 |
| 4,300,717 | 11/1981 | Latham, Jr. | 233/1 A |
| 4,622,029 | 11/1986 | Nilsson | 494/2 |

FOREIGN PATENT DOCUMENTS 2302140  9/1976  France ................. 494/41

OTHER PUBLICATIONS

P. L. Mollison, "Blood Transfusion In Clinical Medicine", pp. 16-18, 1983.

Primary Examiner—Robert W. Jenkins
Attorney, Agent, or Firm—Vaden, Eickenroht, Thompson & Boulware

[57] ABSTRACT

A centrifuge is provided which has a stationary core and a bowl rotatively mounted about the core. The bowl can be configured so that it does not taper inwardly from top to bottom. The bowl has an upwardly extending neck which receives the stationary core. To provide a seal between the core and bowl, a lip seal can be employed which is emplaced about an upwardly extending neck of the bowl and abuts an outwardly and downwardly extending nut formed integrally of the core.

7 Claims, 7 Drawing Figures

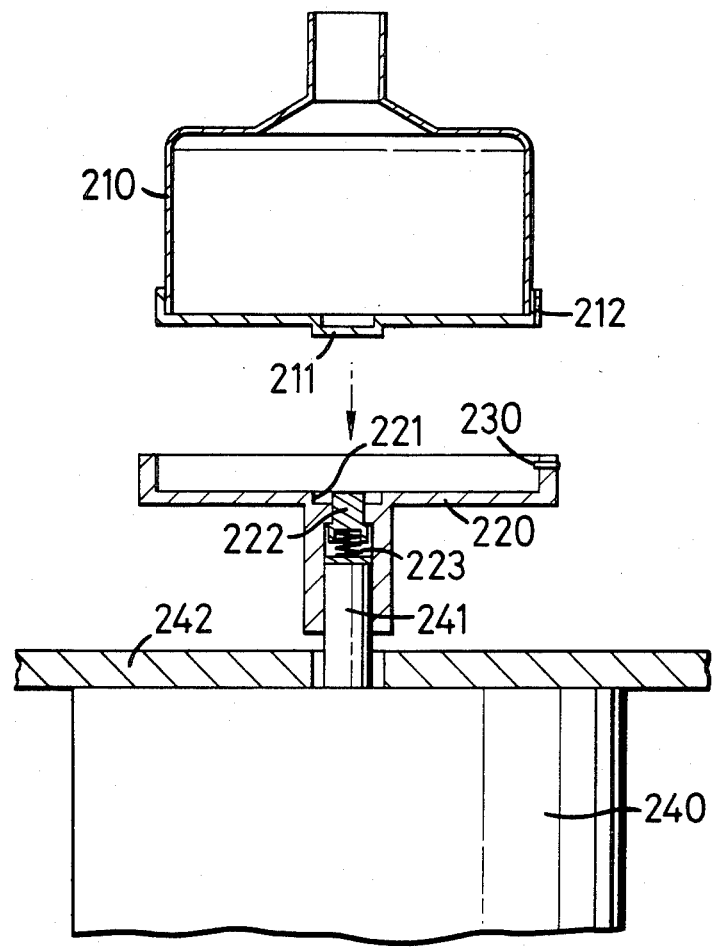

CENTRIFUGE

BACKGROUND OF THE INVENTION

1. Field of the Invention

This invention is directed to the field of centrifuges, to seals therefor, and to bowls for centrifuges. Certain embodiments are particularly suited to applications in the field of blood-processing.

2. Description of the Prior Art

In maintaining or handling blood it is often necessary to perform certain processes, including centrifuging. Among the prior art devices made to meet the stringent requirements of handling blood are the centrifuges of U.S. Pat. No. 3,145,713 and U.S. Pat. No. 3,317,127. The centrifuges described in these patents have applications to pumps, centrifuges, and mixing devices in general. In such centrifuges for sterile processing it is necessary to effectively seal the area between the rotating and stationary members of the device.

In centrifuges for handling fluids subject to contamination, the centrifuge bowl should rotate, but the flow lines for the fluid inlet and outlet should remain stationary. This requires a rotating seal which is effective when frictional heating is so low and the dissipation of heat is so high that the blood, or other heat sensitive fluid, is not exposed to high temperatures. The seal should not produce abraded particulate contaminants which might flow into the blood or other liquid and it is desirable that the seals be easy to install and easy to sterilize. Also the seal should achieve high reliability in service and be capable of tolerating misalignment and vibration.

U.S. Pat. Nos. 3,409,213 and 3,565,330 present examples of rotary centrifuge seals. These patents teach rotary seals which are formed from a stationary rigid low friction member in contact with a moving rigid member to create a dynamic seal, and an elastomeric member which provides a resilient static seal as well as a closing force between the surfaces of the dynamic seal. Another rotary seal, described in U.S. Pat. No. 3,801,142 has a pair of seal elements having confronting annular fluid-tight sealing surfaces which are maintained in a rotatable, but fluid-tight, relationship.

Another rotary seal used in a blood-processing centrifuge known as the "B. T. Bowl", marketed by Bellco, Mirandola, Italy, has a ceramic ring attached to rotatable elements of the centrifuge and a fixed graphite ring attached to stationary centrifuge elements, the ring members being in sealing relationship with each other. An elastomeric diaphragm is connected at one end to an adapter ring for the graphite ring and at the other end to a stationary part of the centrifuge. This type of rotary seal lacks adequate provision for assuring that wear particles will be ingested and expelled to the outside without entry into the fluid pathway.

Because of the outwardly tapering wall shape of the rotating bowl in various prior art centrifuging devices, forces are created which impel the bowl upward. If the apparatus holding the bowl in place fails, comes loose, or is improperly connected, these upward forces can cause the bowl to disengage resulting in damage to the device and possible injury to persons nearby. Also, because of the relatively sharp slope of the bowl walls, the forces which act on the liquid are not uniform or nearly uniform.

SUMMARY OF THE INVENTION

The present invention is directed to an improved centrifuge, seal therefor, securement therefor, and a centrifuge bowl which avoid or eliminate the problems of the prior art devices and which reduce the unwanted upward forces created by prior art bowls. According to the present invention a centrifuge bowl has a stationary core about which is rotatably mounted an outer rotating bowl. An inner hollow shell is secured within the outer rotating bowl. In one embodiment the outer bowl is designed so that the forces developed therein have a downward component which helps hold the bowl down while it is spinning. Because of the relatively flattened configuration of the bowl and the non-outwardly-tapering walls, blood cell retention and washing is facilitated. Also, this configuration permits sufficient forces to be developed at standard speeds so that conventional motors can be used without the necessity of either mechanically or electronically boosting the motor to higher speeds.

The stationary core has a nut formed integrally thereof for receiving and holding the neck of the outer rotating bowl. A first lip seal can be provided between the bowl neck and the nut by a tube placed about the neck cooperating with an expansible seal ring which abuts the interior surface of the nut and presses against the exterior surface of the tube. On the neck above the first tube, a second tube seal can be placed over the neck which extends partially beyond the neck. When the rotating bowl is stationary, the lip of the second tube seal contacts the stationary nut forming a seal which prevents blood and other matter from flowing to the first seal. However, as the bowl spins, the second tube seal is deformed, permitting outwardly forced particles such as particulate contaminants to flow into a trap zone between the second tube seal and the first seal. When the second tube seal has deformed so that it no longer contacts the nut, no abrasion of the seal due to contact with the nut is possible, thereby reducing the amount of abraded particles in the liquid. A baffle is provided within the outer rotating bowl to baffle the flow of liquid exiting the outer bowl. A pin and groove securement means can be provided to assist in holding the bowl in place during operation.

It is therefore an object of the present invention to provide an improved centrifuge, an improved seal therefor, and an improved centrifuge bowl.

Further objects of the present invention are the provision of a centrifuge bowl such that: desired separation of liquid components is achieved at speeds and at centrifugal forces lower than the speeds of prior art devices; improved hematocrits are realized; the level of hemolysis is minimal; the danger of contaminating the centrifuged liquid is reduced; and the need for face seals is eliminated.

Another object of the present invention is the provision of a centrifuge bowl so configured that the upward component of force is reduced and, when used with blood, cell retention and washing is facilitated.

Yet another object of the present invention is the provision of a centrifuge bowl having a deformable lip seal barrier which responds to outwardly directed force during spinning of the centrifuge, deforming in response to such force to permit particulates to be trapped and prevented from flowing into and contaminating the centrifuged liquid. Such a seal does not abrade when it has ceased to contact the sealing surface during rotation.

An additional object of the present invention is the provision of such a centrifuge bowl having an expansible lip seal member for sealing off the trap zone.

A particular object of the present invention is the provision of securements to assist in holding the bowl in place on a rotating mechanism, the securements including recesses on the bowl for receiving and holding pins projecting from the rotating mechanism.

To one of skill in this art who has the benefit of this invention's teachings, other objects and advantages will be clear from the following description of the presently preferred embodiments of the invention, given for the purpose of disclosure, when taken in conjunction with the accompanying drawing. Also it should be understood that, although the preferred embodiments stress the application of the present invention to blood centrifuges, the present invention is directed to centrifuges for the centrifugable liquids.

BRIEF DESCRIPTION OF THE DRAWING

FIG. 3 is a cross-sectional view, drawn to scale, showing a bowl according to the present invention for emplacement on a centrifuge table which is secured to a motor.

FIG. 4c is a side view in cross-section of the recess of FIG. 4a.

DESCRIPTION OF PREFERRED EMBODIMENT

Figure 1:
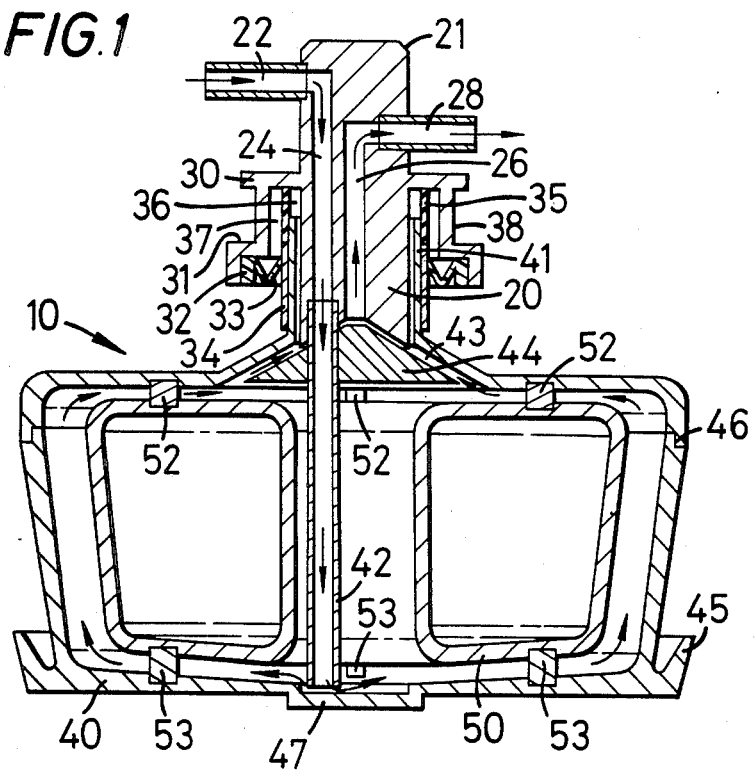
FIG. 1 is a side cross-sectional view, drawn to scale, of a centrifuge according to the present invention.

The Embodiment of FIG. 1

As illustrated in FIG. 1, the centrifuge 10 has the stationary core 20 about which the outer rotating bowl 40 is rotatably mounted. The core 20 has the inlet 22 for receiving the liquid to be centrifuged. The inlet 22 communicates with the inlet channel 24 which in turn communicates with the bowl tube 42 through which the liquid flows into the interior of the outer rotating bowl 40. Centrifuged supernatant liquid, such as blood serum and wash, flow upwardly from the interior of the outer rotating bowl 40 into the outlet channel 26 to the outlet 28 from which the liquid exits the device.

Elements, such as blood cells and platelets (which are known as "formed elements"), are collected in the space between the interior surface of the bowl 40 and the exterior surface of the shell 50 at the sides of the bowl 40. The locating taper 21 on the core 20 facilitates emplacement of the bowl on a motorized table apparatus (not shown).

The core 20 has the stationary nut 30 which is configured to receive, hold and seal the outer rotating bowl 40. The shoulder 31 of the nut 30 has secured thereto the seal 32. The seal 32 has the accordion member 33 for dynamically sealing against the tube 34. In the preferred embodiment the seal 32 is made of an elastomer such as polyurethane or a polymer such as TEFLON (Registered Trademark); the tube 34 is made of metal such as stainless steel or aluminum; and LEXAN is used for the bowl 40, the shell 50, the core 20, and the baffle 44.

The tube 34 is emplaced about the neck 41 of the outer rotating bowl 40. The tube 34 does not extend along the entire length of the neck 41. Another tube, the tube 35, is disposed about the neck 41 and extends beyond it so that its top edge or lip abuts the lower side of the top part of the stationary nut 30. The tube 35 is made of a material which will deform outwardly from neck 41 in response to rotational forces, so that in operation its top edge or lip moves outwardly with respect to the core 20 thereby permitting flow from the trap channel 36 to the trap zone 37. Unwanted particulate contaminates and abraded particles flow toward the seal 32 due to the upward and outward components of rotational forces. As the speed of the centrifuge is reduced and then stops, the seal tube 35 again contacts the nut 30, thereby closing off the trap zone 37 and preventing the back flow of particulate contaminants.

The outer rotating bowl 40 has the stationary baffle 44 mounted to the bowl tube 42 to baffle the flow of liquid into the top channel 43. The lip 45 is formed integrally of the bowl 40 and provides means for securing the bowl in place; an appropriate holding means (not shown in FIG. 1) can grip the lip 45 to hold the bowl 40. The protrusion 47 mounts on a conventional centrifuge table which is connected to a motor (not shown in FIG. 1). The rotative force of the motor is imparted to the table and to the bowl 40 mounted on the table. The inner shell 50 is secured to the bowl 40 by top mount 52 and by bottom mount 53. It is preferred that the inner shell 50 be hollow. It serves to create an area for the accumulation of formed elements. The mounts 52 and 53 are perforated so that centrifuged fluid may flow to top channel 43 and into outlet channel 26.

Figure 2:
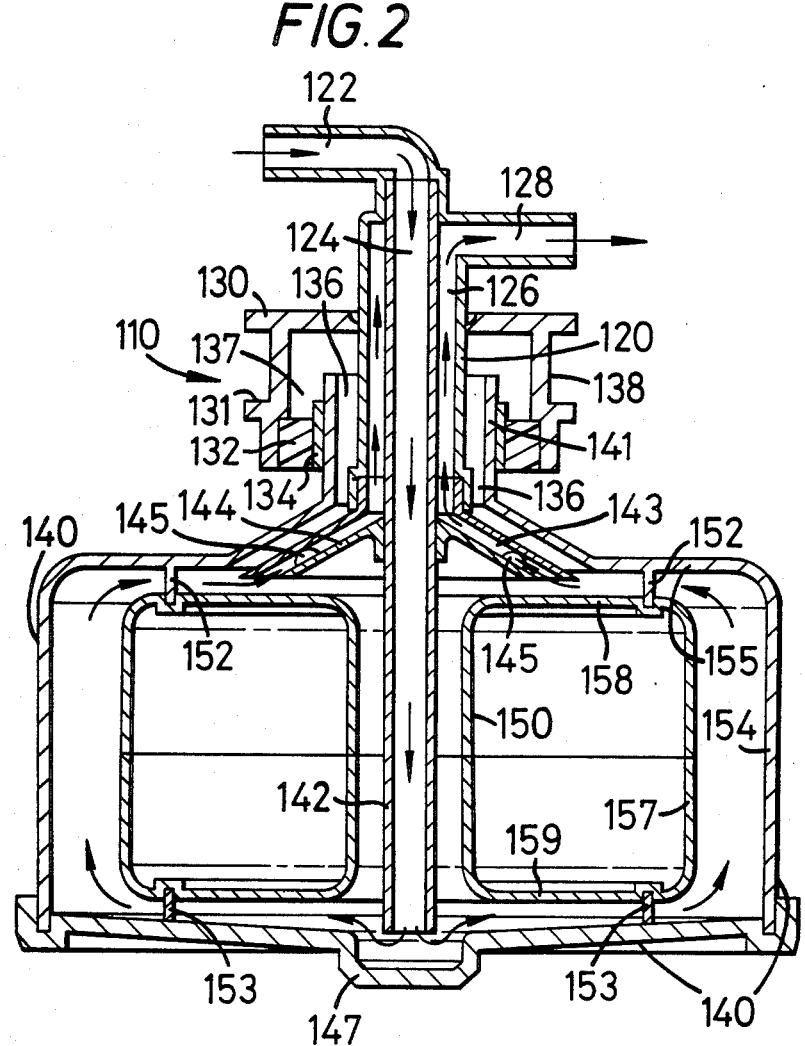
FIG. 2 is a side cross-sectional view, drawn to scale, of another centrifuge according to the present invention.
Figure 4A:
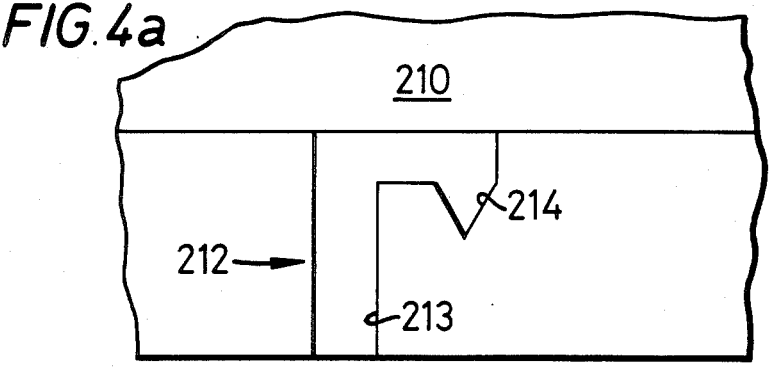
FIG. 4a is a side view in cross-section of a recess in the side of a bowl for receiving and holding a pin projecting from the rotation mechanism.
Figure 4B:
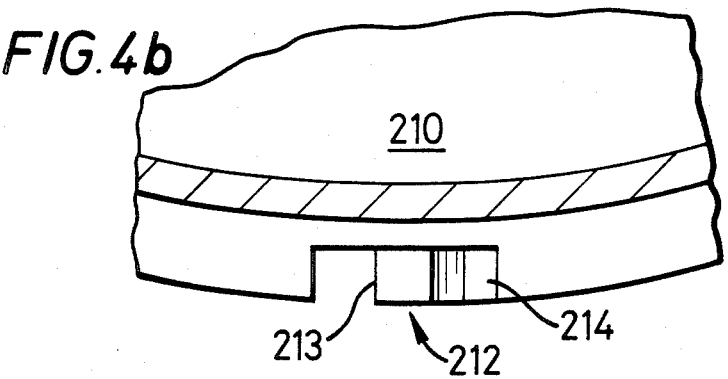
FIG. 4b is a top view of the recess of 4a in cross-section.
Figure 4C:
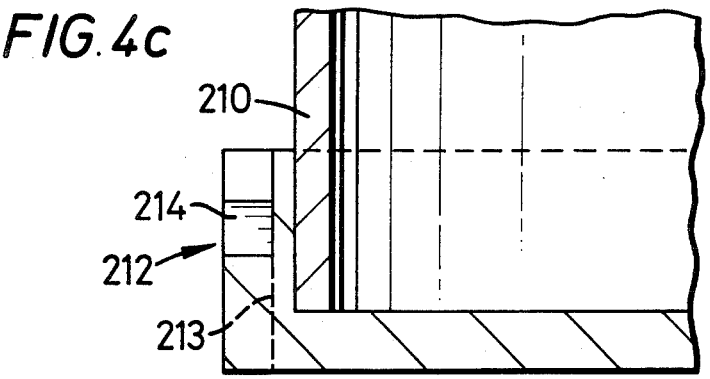

Because of the configuration of the outer rotating bowl 40 and the inner shell 50 in which the sides taper inwardly from top to bottom, the upwardly-directed component of the forces generated by spinning which tend to impel the bowl 40 upwardly are reduced. Also, by flattening the bowl 40 and by increasing its diameter greater centrifugation (separation) forces are generated at lower speeds. A centrifuge bowl made according to the present invention as shown in FIG. 2 consistently produces hematocrits of about 55% to 60% at 3450 r.p.m. and results in a greater amount of platelet retention, whereas commercially available prior art devices produce hematocrits of only about 50% to 55% at this speed. Also minimal levels of hemolysis are achieved with a device according to the present invention.

The Embodiment of FIG. 2

As illustrated in FIG. 2, the centrifuge 110 has the stationary core 120 about which the outer rotating bowl 140 is rotatably mounted. The core 120 has the inlet 122 for receiving the liquid to be centrifuged. The inlet 122 communicates with the bowl tube 142 through which the liquid flows into the interior of the outer rotating bowl 140. Centrifuged supernatant liquid, such as blood serum and wash, flow upwardly from the interior of the outer rotating bowl 140 into the outlet channel 126 to the outlet 128 from which the liquid exits the device.

Elements, such as blood cells and platelets (which are known as "formed elements"), are collected in the space between the interior surface of the bowl 140 and the exterior surface of the inner shell 150 at the sides of the bowl 140.

The core 120 has the stationary nut 130 which is configured to receive, hold and seal the outer rotating bowl 140. The shoulder 131 of the nut 130 has secured thereto the seal 132. The seal 132 sealingly contacts the tube 134 creating a dynamic seal. In the preferred embodiment the seal 132 is made of polyurethane or TEFLON (Registered Trademark); the tube 134 is made of metal, such as stainless steel or aluminum; and LEXAN is used for the bowl 140, the shell 150, the core 120, and the baffle 144.

The tube 134 is emplaced about the neck 141 of the outer rotating bowl 140. The tube 134 does not extend along the entire length of the neck 141. Another tube, such as the tube 35 of FIG. 1, can be used about the neck 141 to operate as it does in the embodiment of FIG. 1.

The outer rotating bowl 140 has the stationary baffle 144 mounted to the bowl tube 142 to baffle the flow of liquid into the top channel 143. The beads 145 serve to facilitate the mounting of the baffle 144 and provide contact points between the baffle 144 and the core 120. The beads 145 are spaced intermittently so that flow through the top channel 143 is possible. The protrusion 147 mounts on a conventional centrifuge table which is connected to a motor (not shown in FIG. 2). The rotative force of the motor is imparted to the table and to the bowl 140 mounted on the table. The inner shell 150 is secured to the bowl 140 by top mount 152 and by bottom mount 153. The mounts 152 and 153 are perforated so that centrifuged fluid may flow to top channel 143 and into outlet channel 126. It is preferred that the inner shell 150 be hollow. The inner shell 150 serves to create an area in the bowl 140 for the accumulation of formed elements.

Because of the configuration of the outer rotating bowl 140 in which the side wall 154 is perpendicular to the top wall 155, and that of the shell 150 in which its side wall 157 is perpendicular to its top wall 158 and to its bottom wall 159, the upwardly-directed component of the forces generated by spinning which would tend to impel the bowl upwardly are reduced. Also, by flattening the bowl 140 as compared to prior art bowls and by increasing its diameter greater centrifugation (separation) forces are generated at lower speeds.

A centrifuge bowl made according to the present invention consistently produces hematocrits of about 55% to 60% at 3450 r.p.m. and results in a greater amount of platelet retention, whereas commercially available prior art devices produce hematocrits of 50% to 55% at this speed. Also minimal levels of hemolysis are achieved with a device according to the present invention.

As shown in FIG. 3 the bowl 210 is emplaceable on and secureable to the table 220 by means of the pin 230. The protrusion 211 of the bowl 210 is received in the recess 221 of the table 220. The plunger 222 contacts the protrusion 211 and, due to the upward force of the spring 223, pushes up against the protrusion 211 thereby forcing the bowl 210 upwardly. The table 220 is secured to the motor shaft 241 of the conventional motor 240. The motor 240 is conventionally mounted to the motor mount member 242.

In the preferred embodiment there are three pins 230 in the table 220, but it should be understood that any suitable number, one or more, may be used. The bowl 210 has a recess (see FIGS. 3, 4a, 4b, 4c) such as the recess 212 for receiving and holding the pin 230. The recess 212 has the inlet groove 213 and the valley groove 214. Because of the upward force of the spring 223, the bowl 210 must be pushed down so that the pin 230 enters the inlet groove 213. When the bowl 210 has been moved sufficiently downward, turning either the bowl 210 or the table 220 in the correct direction will move the pin 230 to a point above the valley groove 214. When downward pressure on the bowl is released the pin 230 will be held in the valley groove 214. To facilitate emplacement of a bowl, more recesses than pins can be provided.

Figure 5:
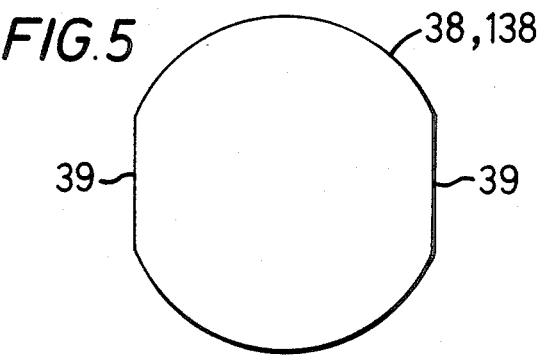
FIG. 5 illustrates in cross-section one embodiment of the exterior surface only of the stationary nut of the core.

FIG. 5 illustrates the preferred embodiment for the clamping surface 38 of the bowl 10 or the clamping surface 138 of the bowl 110. The surface is provided with flat portions 39 which facilitate emplacement of clamping, holding or stabilizing devices about the top of the bowl. Since the diameter of the nuts 30 or 130 is larger than the diameter of their respective stationary cores 20 and 120, more gripping surface is provided for a clamping device to grip as compared to prior art devices in which clamping is accomplished about the core itself or some lesser diameter portion of the core. Also, the nuts 30 and 130 are located relatively low on their cores as compared to the point of clamping on various prior art devices, thereby providing a more stable clamp.

As compared to various prior art devices bowls according to this invention are flatter, wider, and their side walls do not taper outwardly. This permits larger areas of more uniform forces to be created within the bowl which facilitates cell retention and washing. Also the configuration and shape of such bowls permits higher forces to be built up at lower speeds so that motors used to rotate the bowls, such as conventionally available 3450 r.p.m. motors, do not need to be boosted to higher speeds to achieve greater forces and better results.

In conclusion, therefore, it is seen that the present invention and the embodiments disclosed herein are well adapted to carry out the objects and obtain the ends set forth as well as others inherent therein. One of skill in this art who has the benefit of this invention's teachings will realize that certain changes can be made without departing from the spirit and scope of the invention as claimed below.

What is claimed is:

1. A centrifuge for processing liquids having a first and second assembly of components one of which is capable of rotating relative to the other in which the first assembly of components comprises core means for receiving and expelling the liquid and for transmitting the liquid to said second assembly, the second assembly of components comprises bowl means rotatively mounted about said core means for receiving the liquid and holding it, the bowl means having upwardly extending neck means for receiving the core means, the neck means rotating about said core means during operation of the centrifuge, first seal means provided between said core means and said neck means for preventing the egress of liquid from between said core means and said neck means to the exterior of the centrifuge, said first seal means comprising expansible seal means connected to said core means and expanding to sealingly contact said neck means, channel means provided between said core means and said neck means through which a minimal portion of liquid can flow and is forced upwardly and outwardly during operation of the centrifuge, the minimal portion of the liquid flowing into a trap zone formed between said neck means and outwardly and downwardly shoulder extension means of said core means, the flow of the minimal portion of the liquid being prevented from exiting the centrifuge by the first expansible seal means connected to said shoulder extension means and contacting said neck means, said first seal means expanding to push against the neck means, and second seal means disposed within said trap zone and contacting said shoulder extension while the centrifuge is at rest to seal off the trap zone and prevent liquid flow through the channel means, said second seal means made of deformable material which deforms in response to the forces of rotation to open the channel means and permit flow into the trap zone.

2. The centrifuge of claim 1 wherein said first seal means contacts non-corrodable tube means emplaced about said neck means.

3. The centrifuge of claim 2 wherein said second seal means is second tube means securely emplaced about said neck means above said non-corrodable tube.

4. A centrifuge for processing liquids having a first and second assembly of components one of which is capable of rotating relative to the other in which the first assembly of components comprises core means for receiving and expelling the liquid and for transmitting the liquid to said second assembly, the second assembly of components comprises bowl means rotatively mounted about said core means for receiving the liquid and holding it, the bowl means having securing means for securing the bowl means to a rotation mechanism, the securing means comprising one or more securing recesses formed integrally of the outer side of the bowl means for receiving and holding pin means projecting from the rotation mechanism, the rotation mechanism having upwardly thrusting means connected to the rotation mechanism for pushing up on the bowl means when it is secured to the rotation mechanism to facilitate the holding of the pin means in the securing recess or recesses.

5. A centrifuge for processing liquids having a first and second assembly of components one of which is capable of rotating relative to the other in which said first assembly of components comprises core means for receiving and expelling the liquid and for transmitting the liquid to said second assembly, said second assembly of components comprises bowl means rotatively mounted about said core means for receiving the liquid and holding it, hollow interior shell means mounted within said bowl means forming an area in the interior periphery of the bowl means in which elements in the liquid can accumulate, said bowl means having upwardly extending neck means for receiving said core means, the neck means rotating about said core means during operation of the centrifuge, first seal means provided between said core means and said neck means for preventing the egress of liquid from between said core means and said neck means to the exterior of the centrifuge, said first seal means comprising expansible seal means connected to said core means and expanding to sealingly contact said neck means, channel means between said core means and said neck means through which a minimal portion of liquid can flow and is forced upwardly and outwardly during operation of the centrifuge, the minimal portion of the liquid flowing into a trap zone formed between said neck means and outwardly and downwardly shoulder extension means of said core means, the flow of the minimal portion of the liquid being prevented from exiting the centrifuge by the first expansible seal means connected to said shoulder extension means and contacting said neck means, said first seal means expanding to push against the neck means, second seal means disposed within said trap zone and contacting said shoulder extension while the centrifuge is at rest to seal off the trap zone and prevent liquid flow through the channel means, said second seal means made of deformable material which deforms in response to the forces of rotation to open the channel means and permit flow into the trap zone, said first seal means contacting non-corrodable tube means emplaced about said neck means, said second seal means comprising second tube means securely emplaced about said neck means above said non-corrodable tube, and said bowl means having securing means for securing the bowl means to a rotation mechanism, the securing means comprising one or more recesses formed integrally of the outer side of the bowl means for receiving and holding pin means projecting from the rotation mechanism, the rotation mechanism having upwardly thrusting means for pushing against the bowl means to facilitate the holding of the pin means in the securing recess or recesses.

6. A centrifuge comprising a rotating assembly of components, a stationary assembly of components in axial alignment with the rotating assembly, sealing assembly means capable of effecting a fluid tight seal between said rotating assembly and said stationary assembly, said sealing assembly comprising expansible seal means and selectively deformable seal means, the expansible seal means securely emplaced about said statonary assembly and expanding to sealingly contact a portion of said rotating assembly and, the deformable seal means spaced apart from the expansible seal means, the deformable seal means securely emplaced about the rotating assembly and in contact with the stationary assembly while the rotating assembly is at rest but deforming outwardly in response to rotation to permit flow of contaminant particles generated during operation of the centrifuge into a space between the expansible seal means and the deformable seal means, the deformable seal means able to resume its non-deformed at-rest configuration upon cessation of rotation of the rotating assembly thereby trapping contaminant particles in the space between the expansible seal means and the deformable seal means.

7. Seal means for use in a centrifuge for processing liquids and having rotatable elements including a rotatable bowl, stationary elements, means to admit liquid to said rotatable bowl and means for withdrawing processed liquid, said seal means comprising:

the rotatable bowl having an upwardly extending portion attached to rotatable elements received in said stationary elements;

expansible seal means secured to a portion of said stationary elements, and positioned so that there is contact between it and said upwardly extending portion of said bowl, said contact establishing a dynamic seal, and deformable seal means secured to the rotatable bowl, the deformable seal means contacting the stationary elements while the rotatable bowl is at rest but deforming outwardly in response to rotation to permit contaminant particles generated by rotation of the rotatable bowl means to flow past the deformable seal into a space between the deformable seal and the expansible seal means, the contaminant particles entrappable in said space upon cessation of rotation when the deformable seal means returns to its at-rest configuration.

* * * * *